United States Patent

Lorcher et al.

[15] 3,655,017
[45] Apr. 11, 1972

[54] SHOCK ABSORBER ASSEMBLY AND METHOD OF MAKING THE SAME

[72] Inventors: Harry Lorcher, Dittelbrunn; Franz Spreitzer, Schweinfurt am Main, both of Germany

[73] Assignee: Fichtel & Sachs AG, Schweinfurt am Main, Germany

[22] Filed: May 11, 1970

[21] Appl. No.: 35,949

[30] Foreign Application Priority Data

May 14, 1969   Germany.....................P 19 24 540.0

[52] U.S. Cl. ..........................188/321, 285/287, 287/20.2 R
[51] Int. Cl.........................................................F16f 9/54
[58] Field of Search..........................188/321, 322; 285/287; 287/20.2 R, 20.2 RB

[56] References Cited

UNITED STATES PATENTS 3,368,650   2/1968   Wasdell ..............................188/322 X
468,298   2/1892   White et al. ...........................285/287
2,286,435   6/1942   Nerney...............................287/20.2 R Primary Examiner—George E. A. Halvosa
Attorney—Kelman and Berman

[57] ABSTRACT

A partly chromium plated piston rod of a telescopic shock absorber is assembled with a mounting ring by insertion of the unplated axially terminal rod portion and of an adjacent plated portion into a bore of a sleeve on the mounting ring, the chromium plate conformingly engaging the sleeve face in the bore with a press fit, and the unplated rod portion and the sleeve face bounding an annular gap filled with hard solder. When the plated rod portion in the bore has a length at least equal to the rod diameter, and the unplated portion a length of at least 1.25 times the diameter, transverse bending stresses on the assembly are not significantly concentrated in vulnerable portions of the rod, and the rod is held in the sleeve with great strength.

6 Claims, 1 Drawing Figure

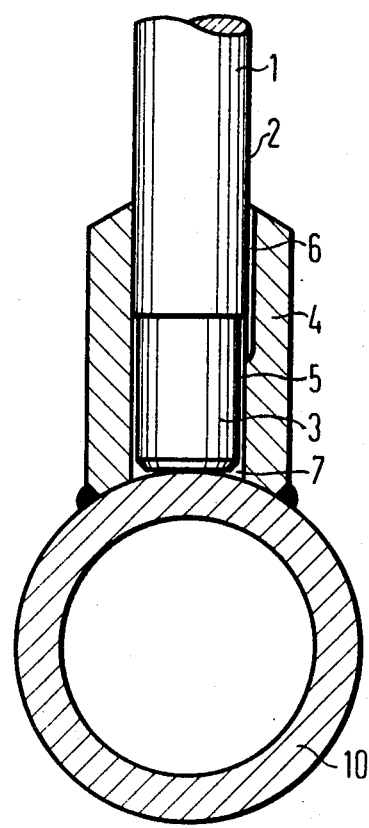

SHOCK ABSORBER ASSEMBLY AND METHOD OF MAKING THE SAME

This invention relates to telescopic shock absorbers of the type in which a piston is axially slidable in a cylinder, a piston rod fixedly fastened to the piston extends outward of the cylinder in an axial direction, and the cylinder and piston rod are attached to mounting elements for fastening to the sprung and unsprung masses of a motorcar or the like. The invention is particularly concerned with the assembly of the piston rod with the associated mounting element.

It is common practice to provide a hard chromium layer on the portions of the piston rod which slidingly cooperate with seals in the associated cylinder and which are exposed to the atmosphere. The free end portion of the rod is received in a bore of the mounting element and secured there by hard soldering. It is left free of chromium for better adhesion of the solder to the bare ferrous metal of the rod. It is at best difficult and costly to solder chromium plated parts, and the solder bond obtained is not normally satisfactory.

When the conventional sub-assembly of piston rod and mounting element is subjected to alternating bending stresses, as is usual in certain shock absorber applications, the stresses are concentrated where the rod enters the bore of the mounting element, and in the vulnerable area where the effective cross section of the rod decreases at the end of the chromium layer. The rod must be dimensioned to resist such concentrated stresses.

It is an object of the invention to avoid undesirable stress concentrations in the piston rod of a telescopic shock absorber and thereby to permit the use of a thinner and lighter piston rod and associated elements without increasing wear or corrosion of the rod.

According to one aspect of this invention, the layer of hard chromium which covers an axial portion of the piston rod outside the shock absorber cylinder extends into the bore of the mounting element. The axially terminal portion of the rod in the bore is free of the chromium layer, and a body of solder is interposed between the axially terminal rod portion and a face of the mounting element in the bore so as fixedly to fasten the rod to the mounting element.

Because of this arrangement, the boundary between the plated and unplated portions of the piston rod is located well within the bore of the mounting element, and bending stresses are distributed more uniformly over the axial length of the rod. The unplated portion still provides adequate anchorage for the solder bond between the rod and the axial face of the mounting element in the bore. For proper stress distribution, the length of the chromium layer received in the bore should be at least approximately equal to the diameter of the normally cylindrical rod.

Best results are obtained when the chromium layer is conformingly engaged by the face of the mounting element defining the bore of the same, so as to provide a friction fit or a very tight sliding fit. Because of the inherently uniform radial thickness of a properly deposited chromium layer, the unplated, axially terminal portion of the rod and the inner face of the mounting element define an annular gap of uniform width practically identical with the thickness of the chromium plate, and thus of capillary dimensions. When solder is fused in the bore, it is drawn into the gap by capillary attraction, and forms a firm bond when solidified by cooling.

It is known that a steel lap soldered to a heavier metal plate with hard solder adheres to the plate with a strength greater than the cohesive strength of the sheet when the soldered lap joint has a width of at least four times the sheet thicknesses. It can readily be calculated from this known fast that the cylindrical solder joint in the shock absorber assembly of this invention must have an axial length of at least 1.25 times the rod diameter for greatest strength.

Escape of air from the bore in the mounting element is facilitated, and a continuous solder bond is more easily achieved when the inner face of the mounting element has axial grooves communicating with the normally solder filled gap between the rod and the inner face of the element, and with the ambient atmosphere by orifices located in a radially extending end wall of the element about the bore and the piston rod.

The invention also provides a method of making the aforedescribed assembly in which a coating of hard chromium is deposited on the piston rod while protecting the axially terminal portion of the rod against deposition of chromium. The terminal portion and a part of the coated rod portion are inserted in the bore of the mounting element, whereby an annular gap is formed between the terminal portion and a face of the element in the bore. A soldering agent is introduced into the bore, and the element together with the terminal rod portion is heated to a temperature sufficient for fusing the soldering agent and distributing the same in the annular gap by capillary action, whereupon the soldering agent is solidified.

Other features, additional objects, and many of the attendant advantages of this invention will readily be understood by reference to the following detailed description of a preferred embodiment when considered in connection with the appended drawing in which the sole FIGURE shows a telescopic shock absorber in fragmentary section on its longitudinal axis.

Only as much of the shock absorber has been illustrated in the drawing as is necessary for an understanding of the invention. The portion of the cylindrical piston rod 1 not seen in the drawing enters a fluid-filled cylinder through an axially terminal, apertured wall, and its longitudinal end portion, which is not visible in the drawing, is attached to a piston axially movable in the cylinder, as is conventional.

This invention is more specifically concerned with the axial portion of the piston rod 1 located outside the non-illustrated cylinder. The piston rod 1 is covered with an electrodeposited coating 2 of hard chrome except for the axially terminal portion 3 whose axial length is substantially 1.25 times the rod diameter. During chromium plating, the rod portion 3 is stopped off, and the usual precautions are taken to make the chromium coating 2 deposited on the exposed steel surface of the rod of uniform thickness about the circumference and the length of the rod 1. The thickness of the illustrated chromium layer is 0.075 mm. and well within the range of 0.05 to 0.10 mm. which is desirable and usual on shock absorber rods, and for this invention.

The bare rod portion 3 and an axially contiguous plated portion of the rod, whose axial length is equal to the rod diameter, are coaxially received in an unplated cylindrical steel sleeve 4 welded to the outer cylindrical wall of a mounting ring 10. The bore of the sleeve 4 conforms to the surface of the chromium coating 2 so that the plated rod portion is received in the sleeve 4 with a press fit. An annular gap 5 is defined between the exposed steel face of the rod portion 3 and the axial inner steel wall of the sleeve 4. The radial width of the gap 5 is uniform and substantially identical with the thickness of the chromium coating 2.

Three axial grooves 6, of which only one is seen in the drawing, are equiangularly distributed in the inner sleeve wall about the common axis of the sleeve 4 and of the piston rod 1. They have orifices in the radially extending, annular end wall of the sleeve 4 remote from the ring 10 and an axial length sufficiently greater than the diameter of the piston rod 1 to communicate with the gap 4.

A bevel about the radial end face of the piston rod portion 3 defines an annular chamber 7 at the closed end of the sleeve 5. The chamber 7 communicates with the narrower gap 5. Hard solder, not shown in the drawing for the sake of clarity, fills the gap 5 and the grooves 6 and partly fills the chamber 7, thereby fixedly fastening the piston rod 1 to the mounting rind 10.

In assembling the rod 1 with the ring 10 and the sleeve 4, hard solder is placed into the closed end of the bore in the sleeve 4 while the sleeve is oriented as shown in the drawing, and the piston rod is driven into the bore of the sleeve. During subsequent heating of the assembly, the solder melts and is drawn by capillary action into the gap 5 and the grooves 6, ultimately appearing at the outer orifices of the grooves to indicate that heating may be discontinued, and the solder permitted to solidify. Air is released from the bore of the sleeve 4 through the grooves 6 during assembly of the sleeve 4 with the rod 1 and during soldering.

When the assembly is subjected to transverse bending stresses, there is no dangerous stress concentration on the rod 1 where it emerges from the sleeve 4, and the rod can therefore be made narrower than a similar piston rod in a conventional assembly designed for the same load and service.

It has been found convenient to insert hard solder into the bore of the sleeve 4 in the form of a ring fitting into the chamber 7 prior to insertion of the rod into the bore. However, analogous results are achieved when the solder is attached to the rod and inserted into the bore with the rod. The unplated rod portion 3 may be dip-coated with solder for this purpose.

Other variations and modifications of the invention will readily suggest themselves to those skilled in the art on the basis of the above teachings, and it should be understood that the invention may be practiced otherwise than as specifically described above without departing from the spirit and scope of the invention as defined in the appended claims.

What is claimed is:

1. In a shock absorber assembly including a cylinder, a piston axially movable in the cylinder, a piston rod attached to the piston and extending from the same outward of said cylinder, and a mounting element on the part of said piston rod outside said cylinder, said mounting element being formed with a bore, and a free end of said piston rod being received in said bore, the improvement which comprises:
   a. a layer of hard chromium covering an axial portion of said piston rod outside said cylinder and extending into said bore,
   b. an axially terminal portion of said rod in said bore being free of said chromium layer, and
   c. a body of solder interposed between said axially terminal portion and a face of said element in said bore and fixedly fastening said rod to said element.

2. In an assembly as set forth in claim 1, said part of said rod being substantially cylindrical, and the axial length of said layer in said bore being at least equal to the diameter of said rod.

3. In an assembly as set forth in claim 2, said bore being substantially cylindrical and coaxial with said rod, said layer being conformingly received in said bore and of substantially uniform radial thickness, and said axially terminal portion of said rod and said face defining an annular gap in said bore axially bounded by said layer, said body of solder substantially filling said gap.

4. In an assembly as set forth in claim 3, the axial length of said terminal portion being at least equal to 1.25 times the diameter of said rod.

5. In an assembly as set forth in claim 4, said element having an annular, radially extending end face about said bore and the piston rod partly received in said bore, and being formed with an axially elongated groove having an orifice in said end face, said groove being open in a radially inward direction, and having an axial length greater than the length of said layer in said bore so as to communicate with said gap.

6. In an assembly as set forth in claim 5, a portion of said body of solder being received in said groove.

* * * * *